United States Patent Office 3,562,018
Patented Feb. 9, 1971

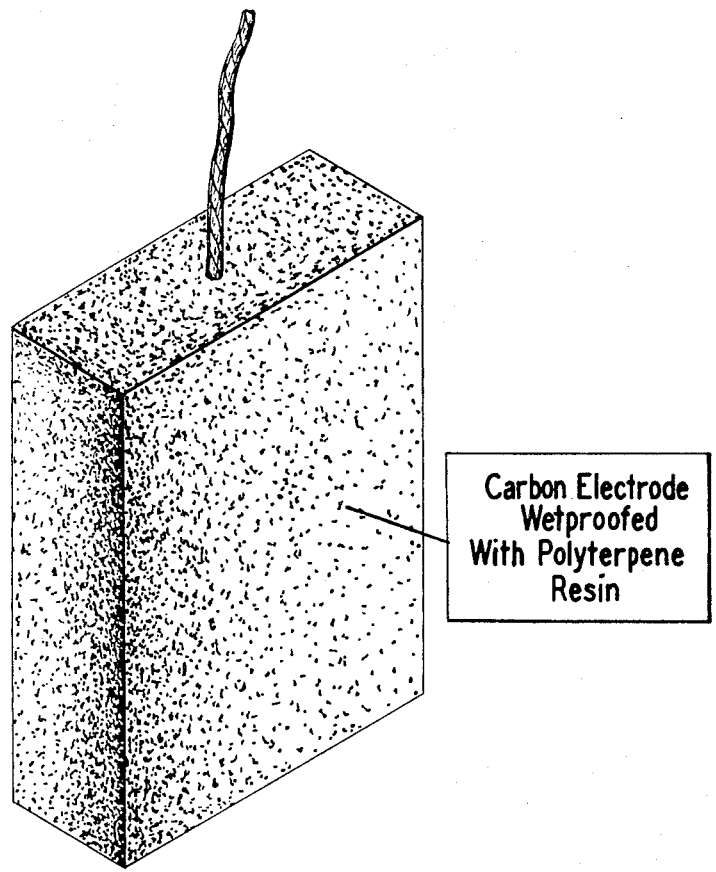

3,562,018
BATTERY COMPRISING CARBON ELECTRODE WETPROOFED WITH POLYTERPENE RESIN
Ellsworth G. Munck, Parma Heights, and Robert F. Hauser, North Olmsted, Ohio, assignors to Union Carbide Corporation, a corporation of New York
Filed Dec. 29, 1967, Ser. No. 694,600
Int. Cl. H01m 13/02, 27/00
U.S. Cl. 136—83     6 Claims

ABSTRACT OF THE DISCLOSURE

Gas permeable carbon electrodes for batteries are rendered repellent to battery electrolyte by polyterpene resin on at least the electrochemically active surfaces of the electrodes.

---

In general this invention pertains to gas permeable carbon electrodes for batteries, and in particular to such an electrode rendered repellent to aqueous electrolyte.

Such electrodes are used, for example, in air-depolarized cells having zinc anodes, caustic alkali electrolyte, and gas permeable carbon cathodes, the later partially immersed in aqueous electrolyte containing a caustic alkali such as caustic soda and extending to the outer atmosphere. Similar electrodes are used in hydrogen-oxygen fuel cells. To prevent undue absorption of electrolyte, the carbon electrodes are wetproofed, usually by impregnation with a material like paraffin or oil.

The penetration of electrolyte must be kept as low as possible, because it reduces the chemical activity or depolarizing ability of the electrode and consequently the output of the cell, especially on heavy drain. Therefore, one object of this invention is to provide a gas pervious electrode having a greater resistance to electrolyte penetration.

In sealed air-depolarized cells a more severe problem may arise. In such cells an air space, provided for the reception of liquid, is completely enclosed, and only the breathing or active carbon electrode is available for release of entrapped gas. In this type of cell, a portion of the active carbon communicates with the free space to provide a path for the escape of gas. However, when the cell is subjected to use, a film of liquid may form on this portion of the carbon electrode, blocking the gas escape pasages. When the internal pressure in the cell increases for any reason, such as the internal generation of gas or the absorption of water vapor from the atmosphere, this liquid is forced into the porous carbon electrode at all areas of conduct with the electrolyte, lessening its depolarizing effectiveness, and may even be forced completely through the electrode to escape from the breathing apertures, creating a serious hazard.

A gas electrode or battery cathode such as those known heretofore, usually comprises a carbonaceous material, oils. The invention comprises such an electrode impregnated or coated with a solution that renders it more resistant to electrolyte penetration.

To increase the wetproofing ordinarily employed to make the air-depolarized carbon electrode resistant to wetting by electrolyte, is not a solution to the problem discussed in connection with sealed cells, because the concentrations of wetproofing agents required for substantially complete repellency destroy the oxygen-sorptive capacity of the electro-chemically active portions of the carbon. Preferential treatment of the venting areas with additional wetproofing material e.g., mineral oil or rubber-oil mixtures, does retard the wetting action but only for a relatively short period, and, furthermore the large amounts of these materials required for adequate protection impair the gas permeability of the carbon electrode, so that even if wetting is delayed, substantial internal pressures may develop.

It is another object of this invention to provide a carbon electrode for use in air-depolarized primary galvanic cells, which electrode is permeable to gas internally generated or compressed in such cells but is not wet by electrolyte and which retains its capacity for depolarization by air.

The sole figure of the drawing is a diagrammatic representation of a carbon electrode wetproofed in accordance with the invention.

The invention comprises a gas permeable battery electrode of carbon having on at least its electrochemically active surface portions a quantity of polyterpene resin sufficient to render the electrode repellent to battery electrolyte. The resin may be applied only to the surface portions of the electrode or may be impregnated throughout the body of the electrode.

Polyterpene resins suitable for use in the invention are polymers of α or β pinene or mixtures thereof which are natural materials obtained from pine tree rosin. Their molecular weights may be as high as 2000. They are available commercially under trade names "Piccolyte" and "Nypene" and their properties and preparation are discussed in the book "Polymers and Resins" by Brage Golding, published by D. Van Nostrand Company, Princeton, New Jersey. As there shown the structural formulas for the pinenes are:

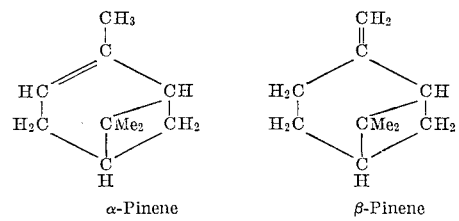

α-Pinene         β-Pinene and the polymerization of α pinene may be represented as follows:

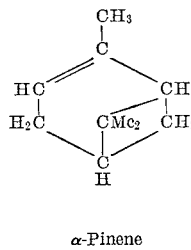

α-Pinene

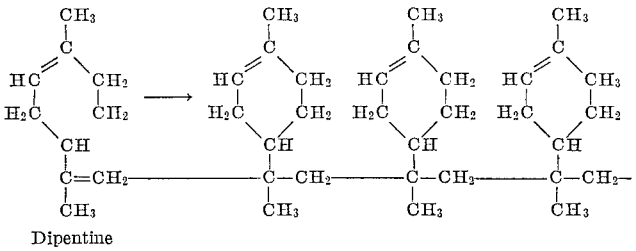

Dipentine and a binder, molded into blocks of suitable size and shape. These blocks may be wetproofed by impregnation with a solution of paraffin and carbon tetrachloride, and the solvent removed by heat. Other wetproofing materials that have been used include petrolatum, stearates and Presently preferred polyterpenes for use in the invention have a molecular weight of about 1200, a softening point of 55° C. to 115° C. The acid and saponification numbers are zero. The resins are soluble in alcohols, ketones, chlorinated hydrocarbons, petroleum-derived solvents and other organic solvents and are unattacked by alkaline solution of the type encountered in batteries.

As indicated above, carbon electrodes for air-depolarized cells are produced from carbonaceous material and a binder. The carbonaceous material is usually a blended mixture of charcoal and powdered carbon derived from coke, and the binder may be an aqueous sugar solution or vinyl or other resin. For fuel cell use a carbon electrode may be supported by a nickel screen backing as described in the paper "Composite Carbon-Metal Electrodes for Fuel Cells" by Clark, Darland and Kordesch in "Electrochemical Technology," vol. 3, No. 5–6, May–June 1965 at pages 166–171.

The application of the polyterpene resin to an electrode to be treated may be accomplished simply by preparing a solution (preferably warmed) of the resin in a solvent and immersing the electrode in the solution for the time sufficient to permit the solution to penetrate the pores of the electrode in at least its surface portions. Suitable solvents are those derived from petroleum, such as toluene, xylene, benzene or kerosene. Other volatile solvents may be used, but since they will be removed from the treated electrode by heating, they must have boiling points below a temperature (about 170° C.) at which the electrodes would be damaged during heating. Similarly, the solvent used should of course not react with the carbon electrode or its binder. The solvent preferably should have a saponification number near zero. Preferred solvents are toluene, kerosene and ethylene dichloride. After immersion and removal of the electrode from the solution the electrode is heated to volatilize and remove the solvent.

Typically, a solution of as little as 1.5% resin in toluene may be used. The solution preferably is warmed to below the boiling point of the solvent, but it may be at room temperature. The quantity of resin in the solution may be as little as 0.5% by weight or as high as 25% or more. Immersion time may be as short as 5 seconds to as long as one hour, but it is desirable that the time be shorter rather than longer, and the more time is dependent in part on the quantity of resin in solution. For the composite electrodes used in fuel cells, five minutes immersion in a 1.5% solution of polyterpene in toluene is satisfactory; good results have been obtained on electrodes for air-depolarized cells in 5 seconds immersion in a solution of 0.5% polyterpene in toluene at room temperature. It is important, of course, that the quantity of resin incorporated in the electrode not destroy its gas permeability. Accordingly, the use of dilute solution is preferred. Removal of solvent, as stated, is accomplished by heating. A simple guide for completion of solvent removal is odor detection, heating being continued until no solvent odor emitting from the treated electrode can be detected. This may require heating for several hours. Usually heating for five to eight hours has been found to achieve this end.

A number of electrodes of the types used in air-depolarized cells and in fuel cells have been prepared embodying the invention and have been tested in comparison with conventional electrodes used commercially. In such tests the electrodes have been placed in cells having conventional aqueous alkaline electrolyte. The cells were placed on normal drain for varying periods of time, and the voltages under load were determined at fixed intervals. The open circuit voltages of the electrodes were measured before and after the tests. The extent of electrolyte penetration was also determined in electrodes embodying the invention and in the conventional electrodes which were subjected to the same tests. The electrodes of the invention showed the minimum penetration of electrolyte and while their electrical discharge characteristics were at least as good as, if not always superior to those of the conventional electrodes, they recovered their initial open circuit voltages much more quickly than did the conventional electrodes.

One of the advantages of the electrodes of the invention is that they are capable of use under heavier drains than the conventional electrodes. Under normal conditions of use of conventional air-depolarized cells a continuous drain of about 600 milliamperes is encountered, with peaks up to about 700 milliamperes. Under such conditions maximum output of these cells is about 1500 to 3000 ampere hours depending upon the construction of the cells. Generally it has been found that if heavier drains than about 600 milliamperes are placed on the conventional cells for long periods of time, they become inoperative due principally to electrolyte penetration of the carbon electrode. As the following data show, electrodes of the invention withstand continuous drains of 900 milliamperes with peaks of 1.6 amperes.

A number of electrodes about 4" x 5" x 1.25" were prepared. One group was treated by immersion in an 0.5% solution of polyterpene resin in toluene for different times, a second in a 1.5% solution and a third in a 25% solution. After immersion the electrodes were heated in air to 150° C. for five hours. Electrodes from all groups were placed in cells and subjected to test in which a 900 milliampere drain was imposed for 23 hours. Then a drain of 1.6 amperes was imposed for 1 hour. This cycle was repeated in each case for three days. The same drain conditions were imposed on cells containing carbon electrodes wetproofed in conventional commercial manner. Results of the test are set forth in Table I below.

In the table the following abbreviations are used:

O.C.V.=Open Circuit Voltage in volts
C.C.V.=Closed Circuit Voltage in volts
ma.=milliamperes
amp.=amperes

TABLE I.—TREATMENT OF ELECTRODES

| | Solution | Immersion time, seconds |
|---|---|---|
| Electrode No.: | | |
| A-1 | 0.5% in toluene | 5 |
| A-2 | do | 30 |
| A-3 | do | 3,600 |
| B-1 | 1.5% in toluene | 5 |
| B-2 | do | 30 |
| B-3 | do | 3,600 |
| C-1 | 25% in toluene | 6 |
| C-2 | do | 30 |
| C-3 | do | 3,600 |
| D | Conventional | |

TESTS OF ELECTRODES

| | Initial O.C.V. | Average C.C.V., 900 ma. | Average C.C.V., 1.6 amp. | Final O.C.V. | Electrolyte pickup, grams |
|---|---|---|---|---|---|
| Electrode No. | | | | | |
| A-1 | 1.34 | 1.20 | 0.95 | 1.34 | 30 |
| A-2 | 1.34 | 1.20 | 0.95 | 1.34 | 30 |
| A-3 | 1.34 | 1.19 | 0.95 | 1.34 | 28 |
| B-1 | 1.35 | 1.19 | 0.97 | 1.34 | 27 |
| B-2 | 1.35 | 1.19 | 0.97 | 1.34 | 26 |
| B-3 | 1.35 | 1.14 | 0.82 | 1.33 | 26 |
| C-1 | 1.33 | 0.82 | 0.40 | 1.24 | 26 |
| C-2 | 1.31 | 0.60 | 0.40 | 0.80 | 23 |
| C-3 | 1.31 | 0.35 | 0.15 | 0.75 | 26 |
| D | 1.38 | (1) | (2) | 0.19 | 175 |

[1] Actual data 900 ma. drain=0.90; 0.47; 0.10 volt.
[2] Actual data 1.6 amp drxin=0.37; 0.10; 0.00 volt.

The data above indicate that best results are obtained with dilute solutions of resin and short immersion time. They also show the failure of conventional commercial electrodes to withstand the conditions of test.

A number of similar tests made with solutions of polyterpene in other solvents heated similarly were made. Other tests made on electrodes treated only with toluene, kerosene, or other solvents showed that the solvent alone does not produce significant wetproofing.

A number of electrodes for fuel cells made as described in the publication above referred to were treated in accordance with the invention. Thus, the electrodes were immersed for five minutes in a 1.5% solution of polyterpene resin in toluene. After immersion they were removed and dried in air for eight hours and then heated to 150°

C. for three hours. The electrodes so treated were placed in test cells and under normal test conditions were found to have a generally higher operating voltage than otherwise similar electrodes not containing the polyterpene resin. The progress of the tests indicates that the electrodes of the invention will have a substantially longer life than the conventional fuel cell electrodes.

We claim:

1. A battery comprising a gas permeable carbon electrode having on at least its electrochemically active surface portions a quantity of polyterpene resin sufficient to render said electrode repellent to battery electrolyte but insufficient to lessen substantially the gas permeabiltiy of said electrode.

2. A battery as defined by claim 1 in which said polyterpene resin has a softening point of about 55° to 115° C.

3. A battery as defined by claim 1 in which said polyterpene resin has a molecular weight of about 1200.

4. A battery as defined by claim 1 in which said polyterpene resin is present throughout the body of said electrode.

5. A battery as defined by claim 1 wherein said electrode has a metal screen backing.

6. A battery as defined by claim 1 in which said polyterpene resin has a saponification number less than 1.0.

References Cited

UNITED STATES PATENTS

| | | | |
|---|---|---|---|
| 2,233,593 | 3/1941 | Eddy et al. | 136—121 |
| 3,112,208 | 11/1963 | Johnson | 106—56 |
| 3,212,937 | 10/1965 | Talvenheimo | 136—122 |
| 3,375,132 | 3/1968 | Geise | 117—228 |

WINSTON A. DOUGLAS, Primary Examiner

A. SKAPARS, Assistant Examiner

U.S. Cl. X.R.

136—121